United States Patent [19]
Chung

[11] Patent Number: 5,771,786
[45] Date of Patent: Jun. 30, 1998

[54] SYSTEM OF COOKING OR HEATING FOOD PRODUCTS WITH MICROWAVES AND HOT OIL

[76] Inventor: Jing-Yau Chung, 13310 Pebblebrook, Houston, Tex. 77079

[21] Appl. No.: 507,464
[22] PCT Filed: Aug. 28, 1995
[86] PCT No.: PCT/US95/10831
§ 371 Date: Aug. 28, 1995
§ 102(e) Date: Aug. 28, 1995
[87] PCT Pub. No.: WO96/07299
PCT Pub. Date: Mar. 7, 1996
[51] Int. Cl.⁶ .............................. A47J 37/12; H05B 6/80
[52] U.S. Cl. ...................... 99/404; 99/451; 99/DIG. 14; 99/443 C; 219/731
[58] Field of Search .......................... 99/404, 409, 418, 99/451, DIG. 14, 443 C, 516, 407; 219/725, 728, 731, 732, 733; 426/242, 438, 243, 94, 302, 303, 305

[56] References Cited

U.S. PATENT DOCUMENTS

| | | |
|---|---|---|
| 2,868,112 | 1/1959 | Bushway . |
| 2,997,566 | 8/1961 | Pierce et al. . |
| 3,365,301 | 1/1968 | Lipoma et al. . |
| 3,479,188 | 11/1969 | Thelen . |
| 3,633,490 | 1/1972 | Schiffmann . |
| 3,679,432 | 7/1972 | Schiffmann et al. . |
| 3,774,003 | 11/1973 | Kaufman, Jr. et al. . |
| 3,805,009 | 4/1974 | Sweet . |
| 3,906,115 | 9/1975 | Jeppson . |
| 4,109,020 | 8/1978 | Gorfien et al. . |
| 4,112,833 | 9/1978 | Oda et al. . |
| 4,154,861 | 5/1979 | Smith . |
| 4,190,757 | 2/1980 | Turpin et al. . |
| 4,271,203 | 6/1981 | Schiffman et al. . |
| 4,289,792 | 9/1981 | Smith . |
| 4,294,858 | 10/1981 | Moule . |
| 4,304,744 | 12/1981 | Stroud . |
| 4,318,931 | 3/1982 | Schiffmann et al. . |
| 4,348,572 | 9/1982 | Moule . |
| 4,371,554 | 2/1983 | Becker . |
| 4,410,779 | 10/1983 | Weiss . |
| 4,486,640 | 12/1984 | Bowen et al. . |
| 4,556,772 | 12/1985 | McCammon et al. . |
| 4,580,024 | 4/1986 | Thomas . |
| 4,593,170 | 6/1986 | Maeda et al. . |
| 4,795,649 | 1/1989 | Kearns et al. . |
| 4,862,791 | 9/1989 | Baughey . |
| 4,868,360 | 9/1989 | Duncan . |
| 4,882,984 | 11/1989 | Eves, II . |
| 4,884,920 | 12/1989 | Chung . |
| 4,897,275 | 1/1990 | Nagai et al. . |
| 4,913,043 | 4/1990 | Cheung . |
| 4,923,704 | 5/1990 | Levinson . |
| 4,938,981 | 7/1990 | Hee . |
| 4,961,948 | 10/1990 | Hee . |
| 4,963,708 | 10/1990 | Kearns et al. . |
| 5,009,903 | 4/1991 | deFigueiredo et al. . |
| 5,009,904 | 4/1991 | Saslaw et al. . |
| 5,019,412 | 5/1991 | Hattori . |
| 5,039,295 | 8/1991 | Cheung . |

(List continued on next page.)

FOREIGN PATENT DOCUMENTS

| | | |
|---|---|---|
| 3743922 A1 | 6/1989 | Germany . |
| 52-70453 | 6/1977 | Japan . |

*Primary Examiner*—Reginald L. Alexander
*Attorney, Agent, or Firm*—Mark A. Oathout

[57] ABSTRACT

The present invention provides a system for cooking and/or heating a food product rapidly with the use of microwave and hot oil heating, which are applied simultaneously during the entire or partial period of the cooking and/or heating time. The food product may be frozen prior to processing, and may consist of an outer wrapper and an inner filling. It is desirable that after a relatively short cooking and/or heating process, the outer wrapper becomes crispy with a uniform golden-brown color while the inner filling reaches a desired temperature.

21 Claims, 14 Drawing Sheets

U.S. PATENT DOCUMENTS

| | | |
|---|---|---|
| 5,057,331 | 10/1991 | Levinson . |
| 5,063,072 | 11/1991 | Gillmore et al. . |
| 5,066,503 | 11/1991 | Ruozi . |
| 5,097,106 | 3/1992 | Arai et al. . |
| 5,124,161 | 6/1992 | van Lengerich et al. . |
| 5,153,403 | 10/1992 | Kimura . |
| 5,166,485 | 11/1992 | Arai et al. . |
| 5,191,183 | 3/1993 | Balboa et al. . |
| 5,194,271 | 3/1993 | Yasosky . |
| 5,272,299 | 12/1993 | Ovadia . |
| 5,333,539 | 8/1994 | Hurley et al. . |
| 5,363,749 | 11/1994 | Hurley et al. . |
| 5,364,136 | 11/1994 | Forti et al. . |

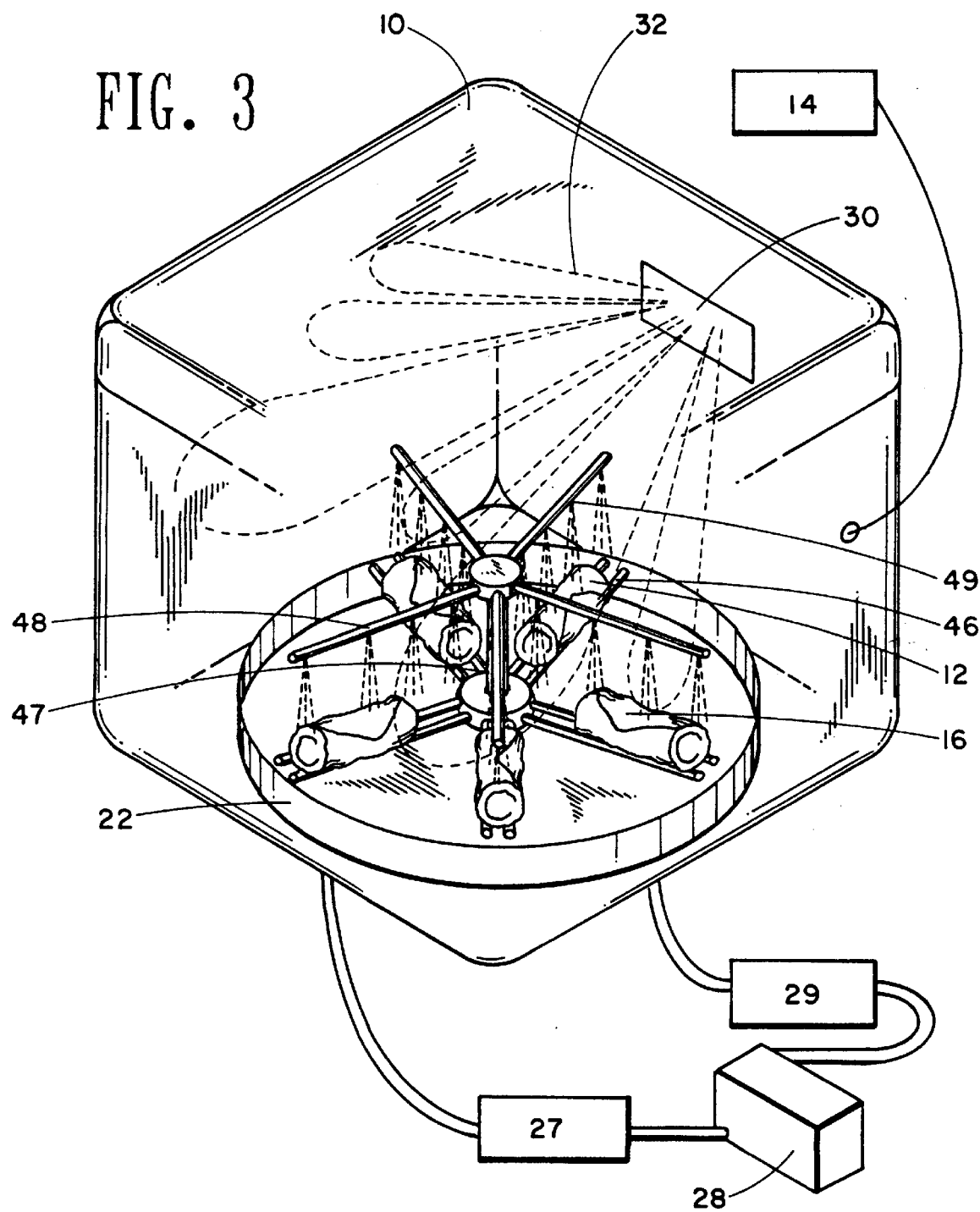

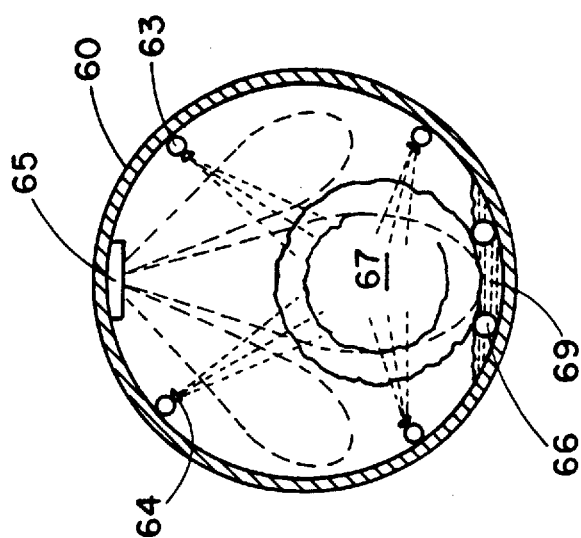
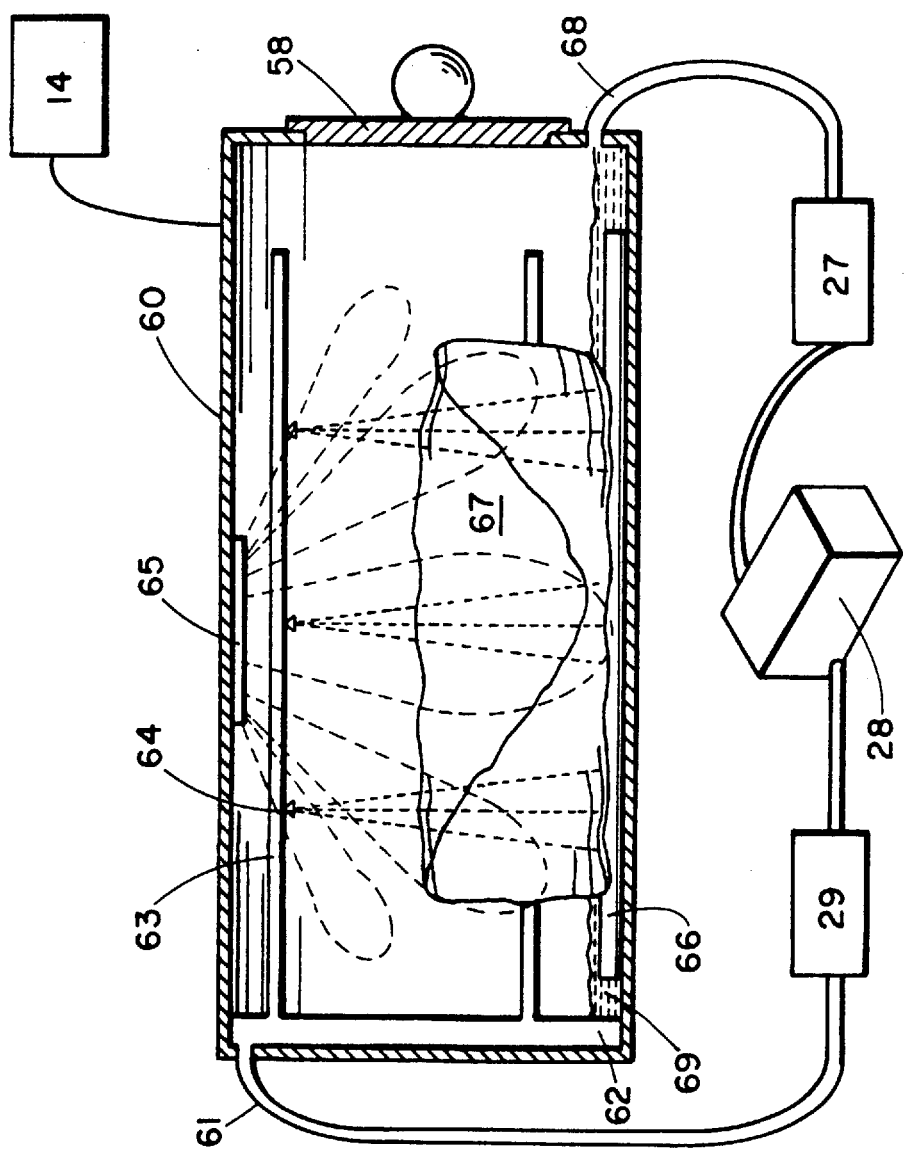
FIG. 7
FIG. 6

SYSTEM OF COOKING OR HEATING FOOD PRODUCTS WITH MICROWAVES AND HOT OIL

BACKGROUND OF THE INVENTION

Food manufacturers are constantly looking for a new improved method of preparing foods. In particular, a rapid and efficient method which also produces high quality foods is always desirable. Special problems, however, are encountered by manufacturers when hot oil heating (deep frying) is involved in cooking and/or heating food products such as egg rolls, pizza rolls, fried taco rolls, fried burritos, corn dogs or break fast rolls etc. which generally consists of a wrapper (outer shell/skin) and an inner filling. Such food products are difficult to cook and/or heat rapidly while at the same time, yielding desirable crispiness of the wrapper (outer shell/skin) and a high quality cooking and/or heating of the inner filler. In general, if a relatively high temperature is applied in the conventional deep-fry cooking and/or heating, the wrapper (outer shell/skin) becomes overcooked and burnt before the inner filling even reaches the desired temperature. This is particularly true when the products are frozen prior to processing.

When heating the somewhat cylindrical food products mentioned above by means of the conventional oil heating alone, it is known from experience in the applicant's egg roll manufacturing plant that for a product of one and one-half inches in diameter, the time required to reach the core temperature of 160 degrees fahrenheit(F) from an initial temperature of 50 degrees F. is about five minutes with the oil temperature being maintained at 355 degrees F. If the same product is frozen prior to processing, it becomes impossible to obtain a satisfactory result by frying alone. For a thin and uniform food product such as french fries, it does not constitute a problem even if they are frozen prior to deep frying. But for the same frozen egg roll mentioned above with an initial temperature of 15 degrees F. and the same frying temperature, the time required to reach a core temperature of 160 degrees F. is about 10 minutes. This core temperature level is required by the U.S. Department of Agriculture meat and poultry inspection on food products such as chicken egg rolls. At this frying time, however, the outer wrapper of the egg roll becomes burnt long before the core temperature reaches 160 degrees F. The present invention is a solution to the problem of cooking and/or heating a frozen or non-frozen food product in a relatively short time is to combine conventional oil heating and microwave heating simultaneously during the entire or partial period of the said cooking and/or heating time.

The microwave is widely used to cook and/or heat food products such as frozen dinners or even frozen egg rolls mainly for its relatively shorter heating time and for simplicity of operation. In the case of heating an egg roll for example, the use of microwave heating alone yields undesirable result. The microwave excites water molecules of the inner filling, thus generating heat and water vapor which causes the egg roll wrapper to become soggy. In general, a food product having a wrapper (outer shell/skin) and an inner filling with moisture cannot be cooked and/or heated satisfactorily with microwaves alone, if it is desired to have a crispy outer crust as the result of cooking and/or heating. This is also true, even for a food product with uniform inner and outer substances such as a french fry where a similar requirement, namely, "a crispy outer layer" is sought after cooking and/or heating.

The above argument supports the necessity of the present invention for using both conventional oil heating and microwave heating for a relatively rapid and better quality cooking and/or heating of a food product consisting of a wrapper (outer shell/skin) and an inner filling. It is apparent that a simultaneous application of the two heating methods will not only further reduce cooking and/or heating time, but also ensure the crispiness of the outer crust after said cooking and/or heating. It should be noted that in the case of cooking egg rolls (or other similar food products), it is not desirable to use microwave cooking prior to a conventional oil frying. An egg roll heated by microwaves yields a soggy egg roll wrapper, a soggy egg roll wrapper breaks easily during deep frying. The only workable method, in this case is to apply the two heating methods simultaneously.

SUMMARY OF THE INVENTION

The present invention provides a system for cooking and/or heating a frozen or a nonfrozen food product by means of combined microwave and conventional oil heating methods which are applied simultaneously during the entire or a partial cooking and/or heating period providing: (a) a rapid cooking and/or heating time and (b) a high quality fried product which gives a crispy outer crust (wrapper) or outer skin.

BRIEF DESCRIPTION OF THE DRAWINGS

FIG. 3 is a view similar to FIG. 1 of another embodiment of the invention.

FIG. 6 is an elevational view of another embodiment of an apparatus which can be used in the system of the invention.

FIG. 7 is an end view of the embodiment shown in FIG. 6.

DETAIL DESCRIPTION OF THE INVENTION

Figure 1:
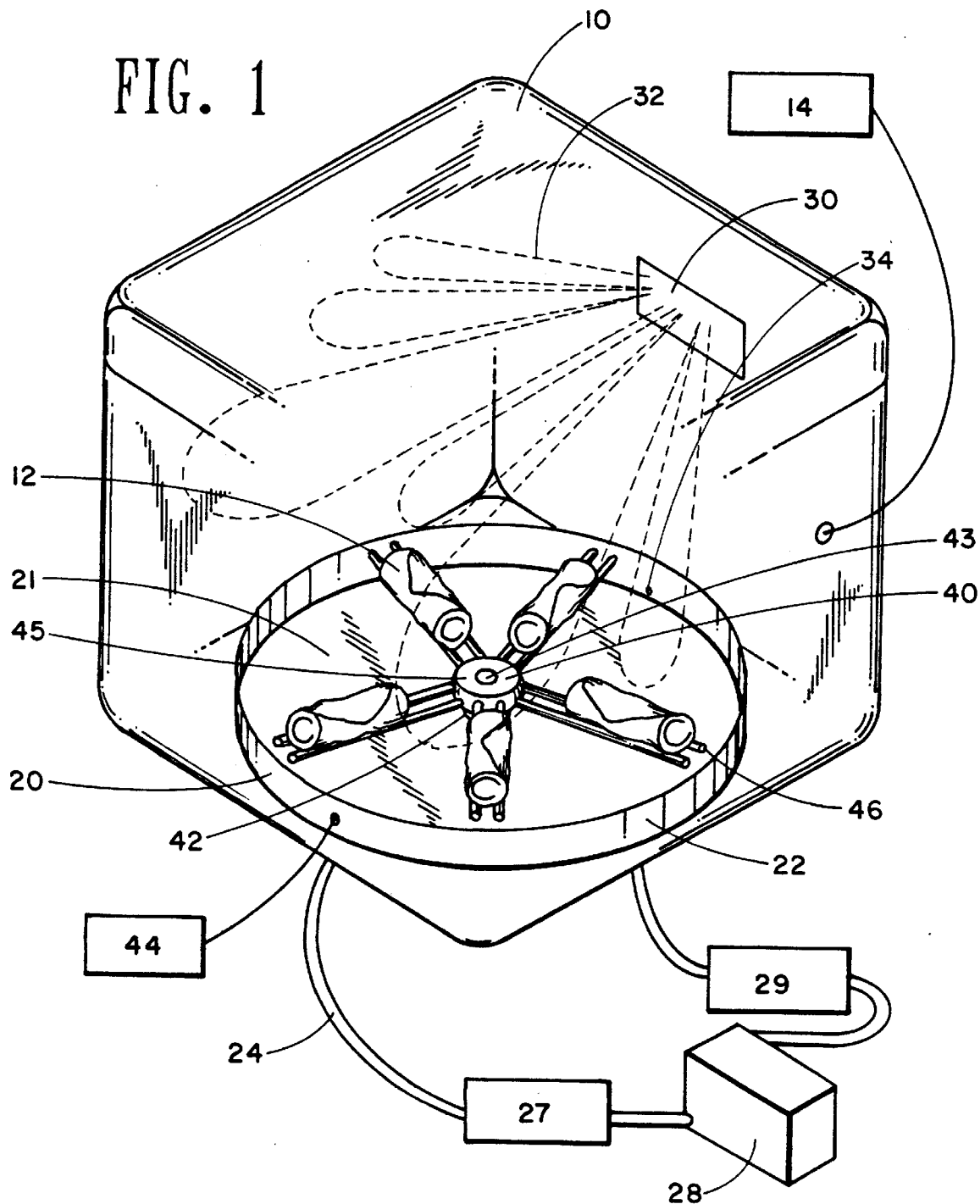
FIG. 1 illustrates an apparatus which may be used in the system of the invention with portions of the apparatus being shown in schematic form.
Figure 2:
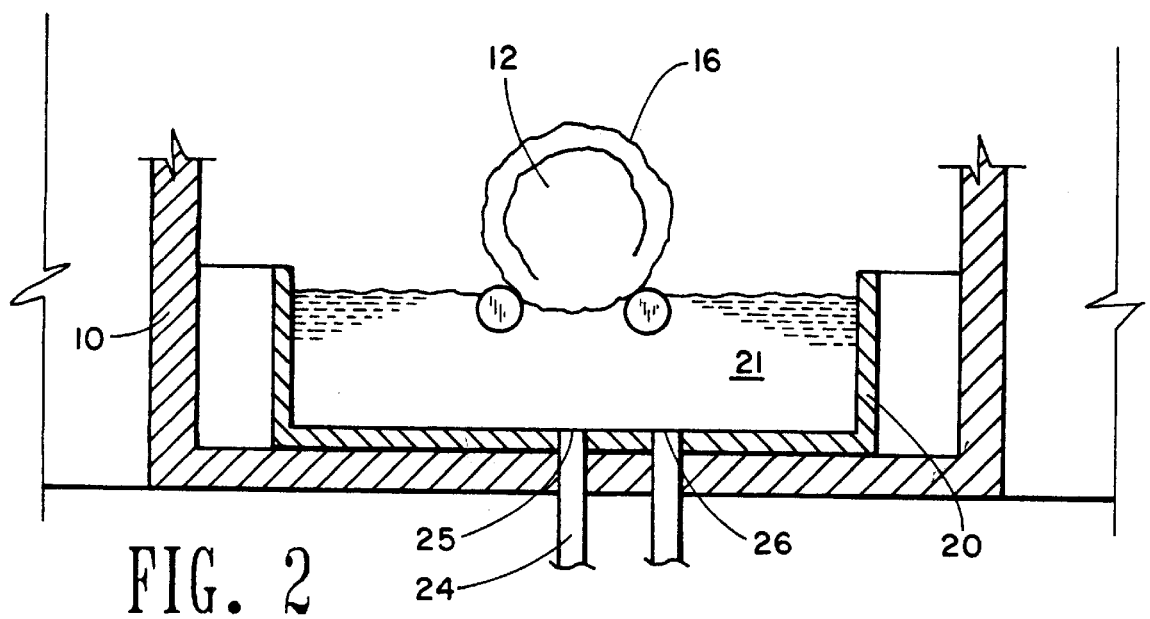
FIG. 2 is a cross-sectional elevational view of the system shown in FIG. 1.

Referring to FIGS. 1 and 2, the system of the present invention generally includes an oven body 10, a hot oil system 20 containing hot oil 21, and a microwave source/receiver 30. The embodiment of the invention may include a rotating tree 40 for moving the food product 12 through the heating medium (oil) while turning the product about its core axis.

The food product 12 is cooked and/or heated in the oven body (or heating chamber) 10 which normally includes a door (not shown). Prior to cooking and/or heating, the food product 12 comprises a raw or a pre-cooked product which may be frozen, refrigerated or at room temperature. The food product generally requires frying, which includes products such as a french fry, a dough-based product such as a donut, or a food product having an inner filling enclosed in an outer shell such as an egg roll shown in FIG. 2 with the outer wrapper 16. Other food products represented by 12 may include similar products such as pizza rolls, spinach rolls, fried taco rolls, fried burritos, corn dogs, breakfast rolls, fried pies and pastries etc. As mentioned above, the food product 12 in a raw or pre-cooked form is placed into the oven body 10 frozen, refrigerated or at room temperature. It is desirable to cook and/or heat the product rapidly and to obtain a high quality crispy outer crust with a desirable uniform color while the inner filling reaches a desirable temperature which, in the case of a meat or poultry product, must comply with USDA regulations. The problems encountered in processing such food products and some solutions to the problems are discussed in U.S. Pat. No. 4,844,920 which was issued to the present applicant on Jul. 4, 1989 and which is intended to be incorporated herein.

A control system 14 which includes a temperature sensor 34 is connected to the oven body 10, the hot oil system 20, the microwave source/receiver 30 and the revolving tree 40 to regulate variables such as cooking and/or heating time, temperature, rotating speed, etc. The components to be used in such a control system are those known to one having ordinary skill in the existing art. For example, a temperature sensor 34 is located inside the oil container 22 to register hot oil temperature for: (a) regulating the hot oil temperature and (b) monitoring the temperature and activating a safety shut-down in the event that the oil becomes over heated.

The hot oil system 20 includes an oil container 22. The oil container 22 contains hot oil 21 which is heated either by an external oil heater 28 or by the microwave or by both the oil heater and the microwave. The oil container 22 is constructed in such a way that the food product 12 can be fully or partially submerged in the hot oil 21 while rotating horizontally through the hot oil 21. An oil circulating line 24 having feed-throughs 25 and 26 connects the oil container 22 to the optional oil heater 28 with oil filter 27 and oil pump 29 at the inlet and the outlet sides of the oil heater 28 respectively. Other devices (not shown) may be added to the oil circulating line 24 to reduce the FFA (free fatty acids) in the oil.

The system of the present invention described above generally operates with the oven body 10, the hot oil system 20 consisting of the oil container 22 filled with hot oil 21 for the submersion of the food product(s) 12 and a control system 14 which includes a temperature sensor 34. It may also operate without the hot oil system 20 where the oil is heated directly by the microwaves. The system may also include an optional revolving tree 40. The revolving tree 40 generally includes a journal 42 with a drive shaft 43 which is driven by a variable speed motor 44. A hub 45 is connected to the top end of drive shaft 43. Hub 45 supports rollers 46. The rollers 46 are preferably grouped in parallel pairs to support the food product 12. By doing so, one roller of the said pair is in the radial direction with respect to the shaft 43, while the other is parallel to the aforementioned roller and in a slightly off-radial direction. The roller in the radial direction is driven by a gear in hub 45 or by the stationary oil container 22 and rotates about its own axis, while the roller in the off-radial direction is driven by the food product 12 whose rotational motion about its core axis is created by the roller in the radial direction. The roller pairs 46, however, rotate as a group about the drive shaft 43 to form a revolving tree 40. The rotation of the roller pairs about their own axis may be omitted as an alternative revolving tree system 40 in which the food product 12 is submerged completely in the hot oil. The roller pairs 46 are preferably on a horizontal plane in a "near-radial" direction with respect to the shaft 43 in order to support and to rotate the food product 12. The roller pairs 46 are generally spaced less than the diameter of the food product. The rollers 46 should be at a height below the top of the oil container 22 so that the food product 12 can be fully or partially submerged in the hot oil. The rollers may be made or coated with TEFLON or some other material which prevents the food product 12 from sticking to the rollers. In fact a material such as TEFLON is ideal to be used in the present system due to its workability in the microwave field as well as its working temperature range.

The microwave source/receiver 30 is connected anywhere within the oven body 10 and it produces a microwave field depicted by the field intensity contours 32. The microwave field 32 is preferably a relatively high intensity field to shorten the cooking and/or heating time.

Referring to FIG. 3, another embodiment of the invention which is similar to that shown in FIG. 1 is represented. In addition to the features shown in FIG. 1, the embodiment shown in FIG. 3 includes an extension drive shaft 47 which is connected to the drive shaft shown in FIG. 1. The upper end of the extension drive shaft 47 supports a plurality of poles 48 which are positioned one each above the roller pairs 46. The poles 48 contain nozzles 49. A hot oil line (not shown) runs through drive shaft 43 and extension drive shaft 47 through poles 48 to the nozzles 49 for spraying hot oil over the food product 12.

Figure 4:
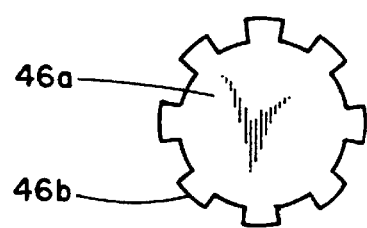
FIG. 4 is an end-view of another embodiment of a roller which can be used in the invention.

Referring to FIG. 4, if the rollers are to be driven about their axis, it may be desirable to have a roller 46a having teeth 46b to improve contact for turning the food product 12.

Figure 5:
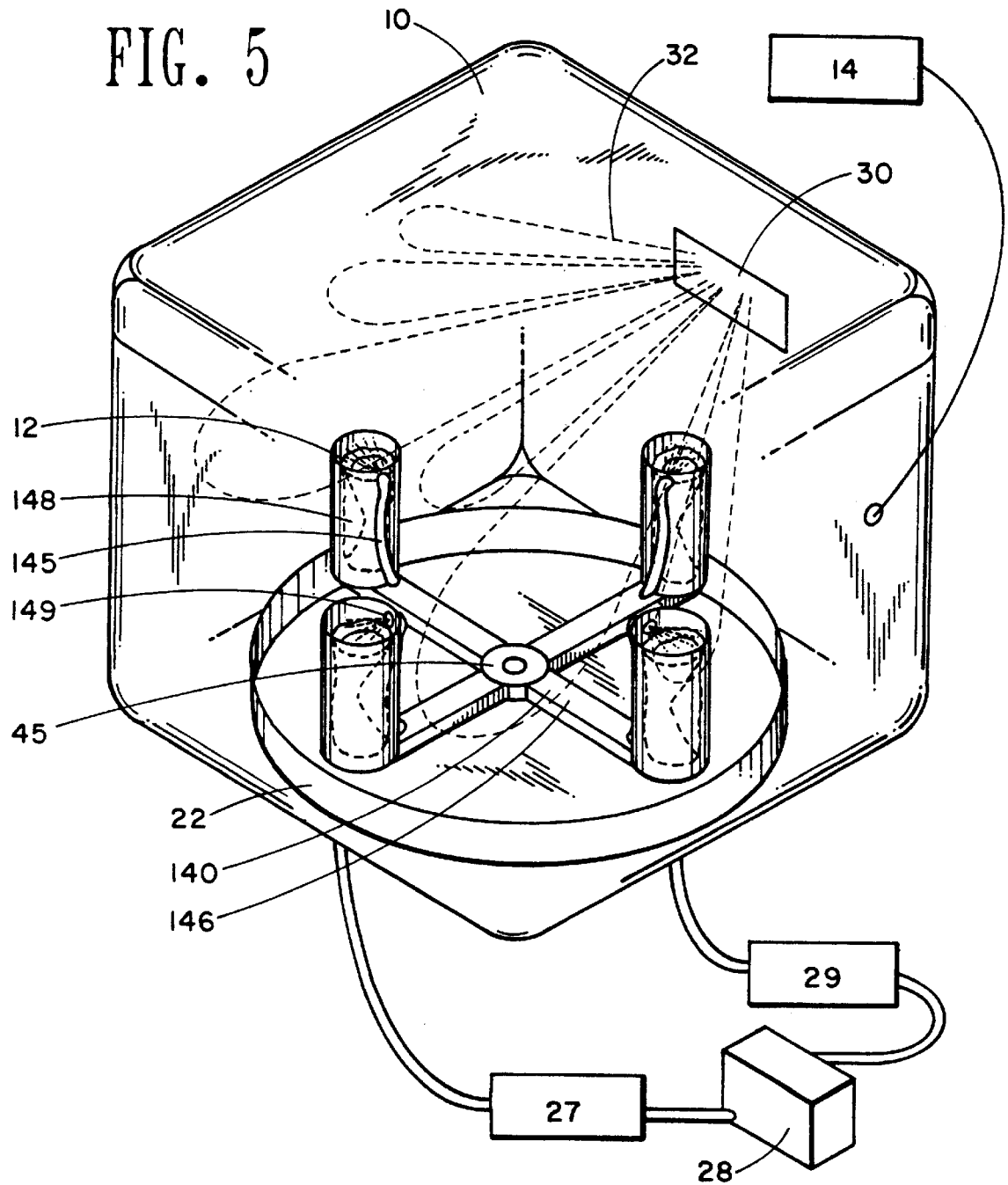
FIG. 5 is a view similar to FIG. 1 showing another embodiment of the invention.

The embodiment of the invention shown in FIG. 5 is similar to that shown in FIG. 1 except that in this embodiment, the revolving tree 140 includes arms 146 which extend from hub 45 on one end and support receptacles 148 on the other end. Hot oil lines 145 run from the journal 42 through the beams 146 and up to the upper end of the receptacles 148 where they are attached to nozzles 149. The receptacles 148 are upright (the longer axis is vertical) and open at the top so that a food product 12 such as an egg roll can be placed within the receptacle 148. In this embodiment the oil container 22 catches any hot oil that spills over at the top of the receptacles 148 as the receptacles 148 are rotated in the microwave field 32.

Referring to FIGS. 6 and 7, an individualized food product heating oven or chamber 60 which may be in any configuration is shown. In this embodiment, a hot oil feed line 61 is introduced into a hot oil manifold 62 which is connected to a plurality of parallel hot oil feed lines 63. Each hot oil feed line 63 contains one or more spray nozzles 64 as needed to uniformly direct hot oil to the food product 67. The hot oil feed lines 63 are preferably connected to the inside surface of the chamber 60 with each line placed as needed in conjunction with nozzles 64 to uniformly direct hot oil to the food product. A microwave source 65 is connected through the chamber 60. A pair of mounting rods 66 are attached across the lower end within the chamber 60 and they serve as a stand for the food product 67. A hot oil evacuation line 68 is located on the lower end of chamber 60 to drain hot oil 69.

The chamber 60 may be made of metal or some other material suitable to confine the microwave field within the chamber. Food product 67 is inserted into the chamber 60 and is heated by microwaves generated by a microwave emitter/receiver 65 and by hot oil 69. Spray nozzles 64 and the pool of hot oil 69 direct hot oil around the entire surface area of the food product 67. The system contains a filter 27, heater 28, pump 29, and a control system 14.

Figure 9:
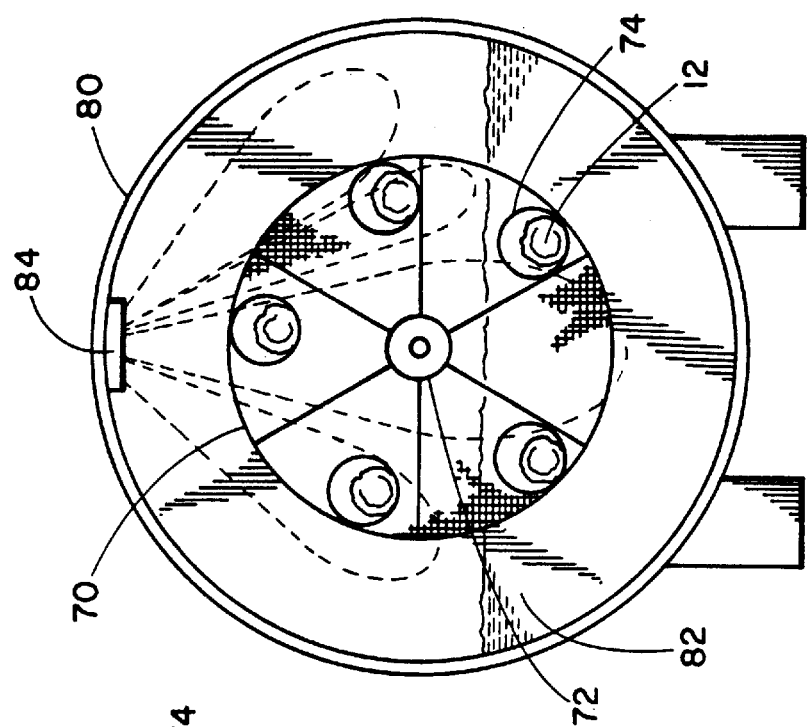
FIG. 9 is an end view of the embodiment shown in FIG. 8.
Figure 8:
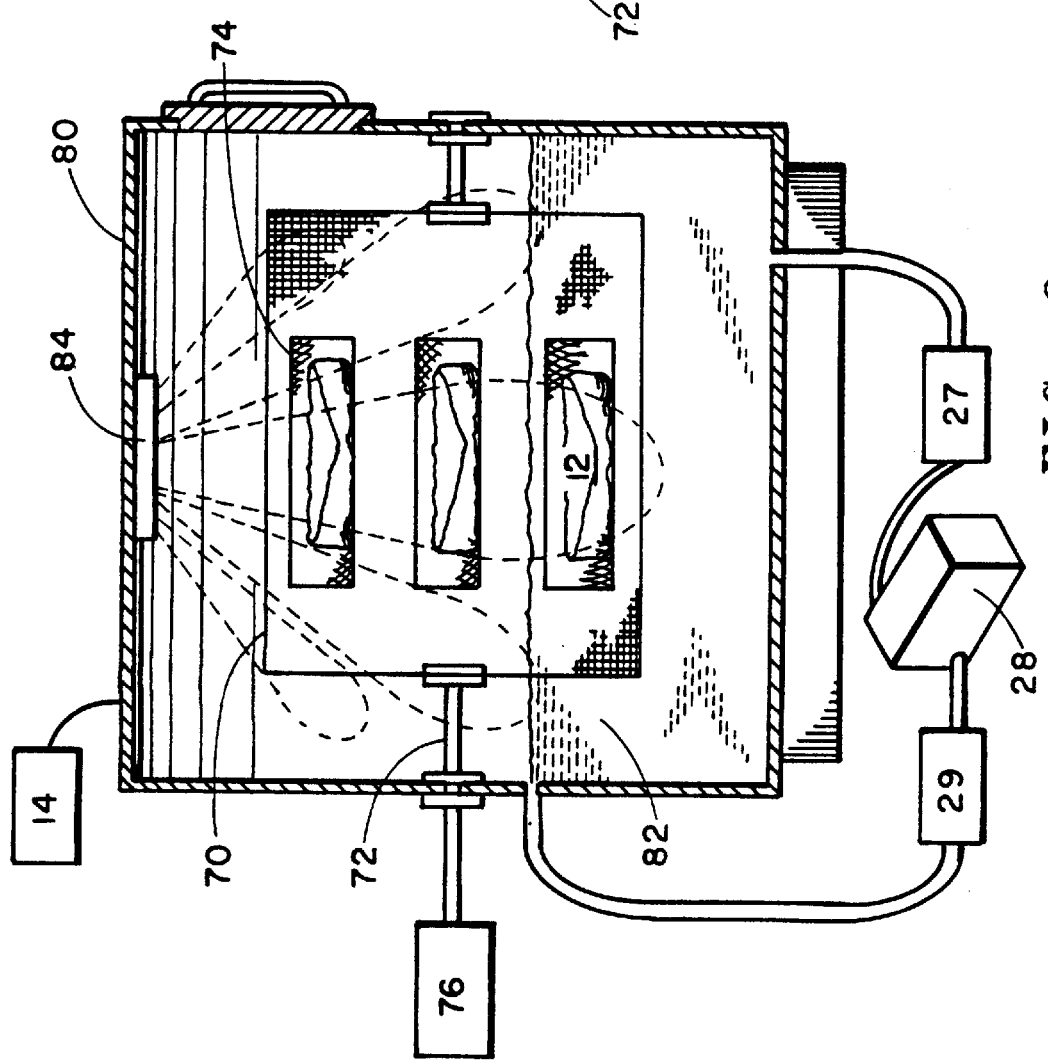
FIG. 8 is an elevational view of another embodiment of an apparatus which can be used in the system of the invention.

Referring to FIGS. 8 and 9, another embodiment of the invention is shown in which a perforated cylinder 70 is rotated within an oven or shell 80. The shell 80 is stationary and contains a reservoir or volume 82 of hot oil. The perforated cylinder 70 rotates about a central axis 72. The central axis 72 is supported by bearings 73 in shell 80 and is driven by motor 76. Perforated baskets 74 are mounted within the perforated cylinder 70 such that when the perforated cylinder 70 is rotated about an axis 72 the basket 74 will pass through the volume of hot oil 82. Baskets 74 are constructed of a sufficient size to contain a food product 12 to be heated by the hot oil 82 and microwave source 84.

The system of the present invention may be applied to serve a freshly cooked and/or heated food product such as an egg roll to customers. Prior to cooking and/or heating, the food product may be in a raw or pre-cooked form and may be in a frozen or non-frozen state. In this application, it is desirable to completely cook and/or heat said food product in a short time in order to serve a customer quickly. In order to achieve the rapid and full cooking and/or heating of the food product, the hot oil should be heated to a relatively high temperature range (about 350 to 500 degrees F.). Control system 14 can include a safety shutoff feature to shut off the heater 28 as well as the microwave power when the oil temperature inside the microwave chamber reaches the high limit to prevent a fire and/or burning of the food. The oil temperature inside the apparatus is detected by a temperature sensor 34 located in the hot oil container 21. In order to achieve a rapid and thorough cooking and/or heating, it is preferred to utilize a relatively high intensity microwave field within which the object(s) to be cooked and/or heated are placed. A microwave field is used simultaneously with the application of hot oil to heat the food product 12 in less than a minute, obtaining a crispy (but not burned, sometimes golden-brown) outer crust and to fully and uniformly cook and/or heat the core or filling to a desired temperature which must comply with USDA regulations in the case of a meat or poultry product—for a meat product, the temperature must reach 145 degrees F. or above, for a poultry product it must reach 160 degrees F. or above.

In some applications of the present system, it may be desirable to apply hot oil either shortly before or after microwaving or to stagger starting and stopping times of hot oil application and microwaving. The system could also be constructed with more than one microwave source/receiver to achieve a desired microwave field.

In a recent experiment using the system of the present invention shown in FIG. 1 without the revolving tree 40, a refrigerated raw egg roll was successfully cooked in a much shorter time compared to the time required in a conventional deep frying method adopted in the applicant's egg roll manufacturing plant. This experiment showed that the cooking time required by the applicant's current conventional frying method was reduced by as much as sixty five percent by using the system of the present invention with a moderate microwave power (900 watts) and oil temperature (355 degrees F.). Moreover, if the applicant tried to use the conventional cooking method, namely deep frying, to cook the same raw egg roll from a frozen state, the egg roll would have to be defrosted prior to cooking. Otherwise the egg roll wrapper would be burnt before the egg roll core temperature reaches 160 degrees F. which is required in this particular cooking procedure.

It may be advantageous to utilize an oven 100 which does not incorporate a traditional microwave oven door (requiring a vertical door to be opened and closed to insert and remove food products which may interrupt cooking), to utilize a pan 130 which drains excess oil away from the food product 12 to move fresh air in and greasy air out of the oven, to contain the grease, and to readily load and unload food products 12. Therefore, referring to FIGS. 10 and 16, an embodiment of the invention incorporating these advantages is shown. This embodiment generally includes an oven 100, a vat 110, a vent 120, a pan 130, a chute 150, a motor 160, a carrousel 170 and a cover 190.

The oven 100 includes walls 101, 102, 103 and 104, a base 106 and a top 108. Front wall 101 includes an upper panel 101a and a lower panel 101b which define a slot 105 therebetween. A food product 12 such as an eggroll must pass in and out of the oven 100 through slot 105. In the case of an eggroll, the slot 105 is preferably approximately two (2) inches in height and runs from wall 102 to the wall 104.

A vat 110 is contained within the oven 100. The vat 110 contains a pool of oil 112 (see FIG. 16). An oil circulation system (not shown, but similar to the system shown in FIG. 1, reference numbers 24, 27, 28 and 29) is connected to the vat 110 for cleaning, heating and circulating the oil 112.

Vent 120 may be connected to the oven 100 through the top 108 of the oven 100. Vent 120 preferably includes a grease filter system (not shown) and a blower (not shown).

Figure 10:
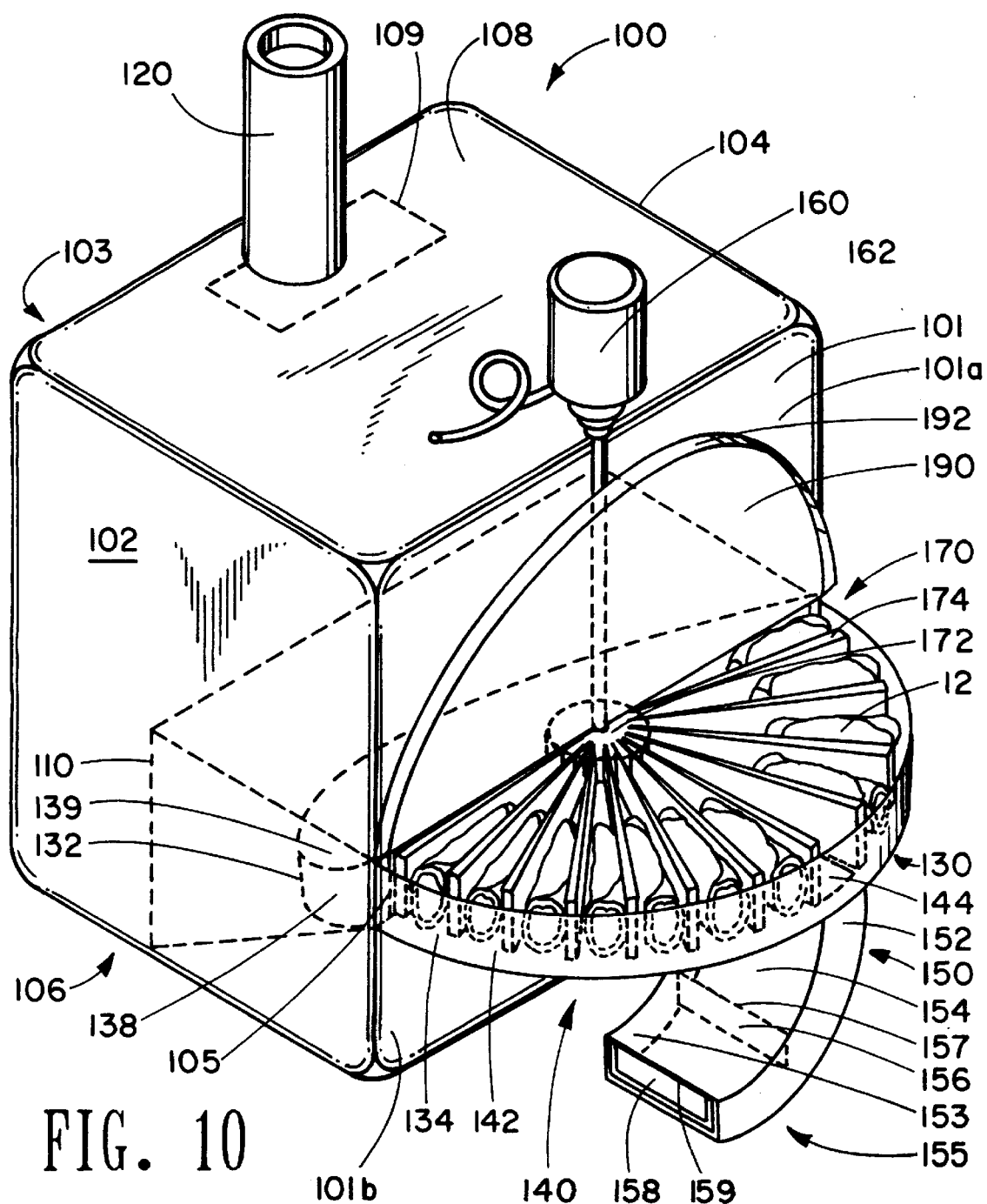
FIG. 10 is a view similar to FIG. 1 of another embodiment of the invention.
Figure 16:
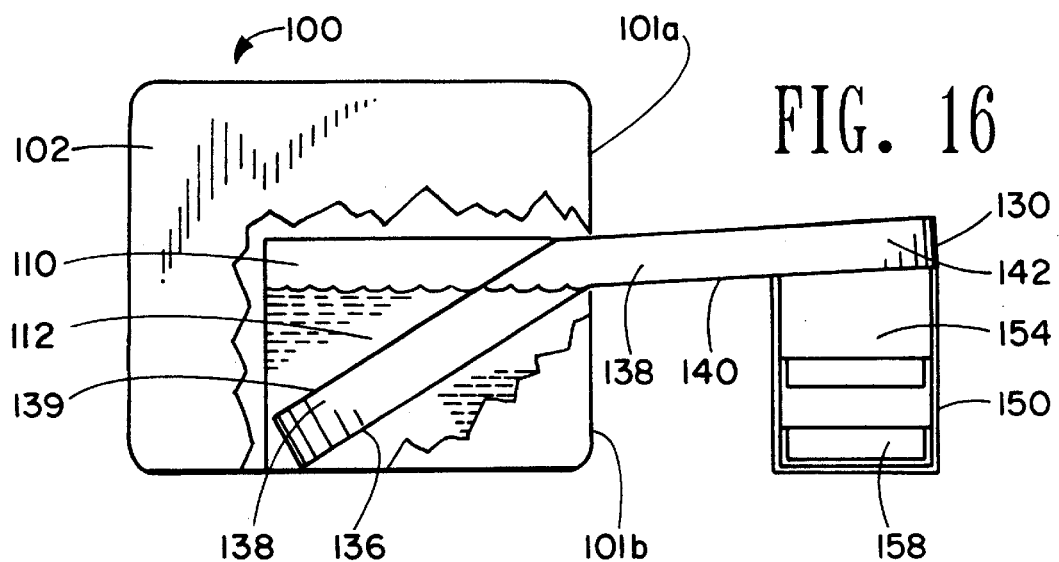
FIG. 16 is an elevational view of the embodiment shown in FIG. 10 with portions of the apparatus being shown in schematic form.

A pan 130 is connected to the oven 100 through slot 105. The pan 130 includes an internal portion 132 and an external portion 134. The internal portion 132 of the pan 130 includes a bottom 136, a peripheral sidewall 138 and a screen 139 (which is connected to the sidewall 138 to cover the internal portion 132 of the pan 130). The internal bottom 136 of the pan 130 is preferably planar, semi circular and slanted or inclined at an angle oblique to the horizontal. The angle of the slant may vary but as shown in FIGS. 10 and 16 the slant is at an angle of approximately forty-five (45) degrees from the horizontal.

The external portion 134 of the pan 130 is preferably planar, semi circular and includes a bottom 140 and a peripheral sidewall 142. The external bottom 140 of the pan 130 is also preferably slanted or inclined at an angle oblique to the horizontal. The angle of this slant may also vary but as shown in FIGS. 10 and 16 the slant is at an angle of approximately five (5) degrees from the horizontal. The external bottom 140 of the pan 130 may include an opening 144 near the perimeter of the external bottom 140. The opening 144 should be greater than the length and the diameter of the food product 12.

A chute 150 is connected to the external bottom 140 of the pan 130 directly under the opening 144. The chute 150 includes arcuate sidewalls 152 and 153, an arcuate top 154 and an arcuate bottom 155. A hinge 157 connects a one-way door 156 to the top 154 and within the chute 150. A hinge 159 connects a one-way door 158 to the top 154 and within the chute 150. The doors 156 and 158 should be spaced apart by a distance greater than the diameter of the food product 12. Gaps are defined between the perimeters of the doors 156 and 158 and the inner dimensions of the chute 150. The gaps should be about one-eighth of an inch to allow air to be sucked through the chute 150, into the pan 130, into the oven 100 and out through the vent 120.

A motor 160 is coupled to a shaft 162. Shaft 162 is coupled to a carrousel 170.

Carrousel 170, generally includes a hub 172 and upright arms 174. The hub 172 is coupled to the shaft 162. The arms 174 are hinged or connected to the hub 172.

Figure 14:
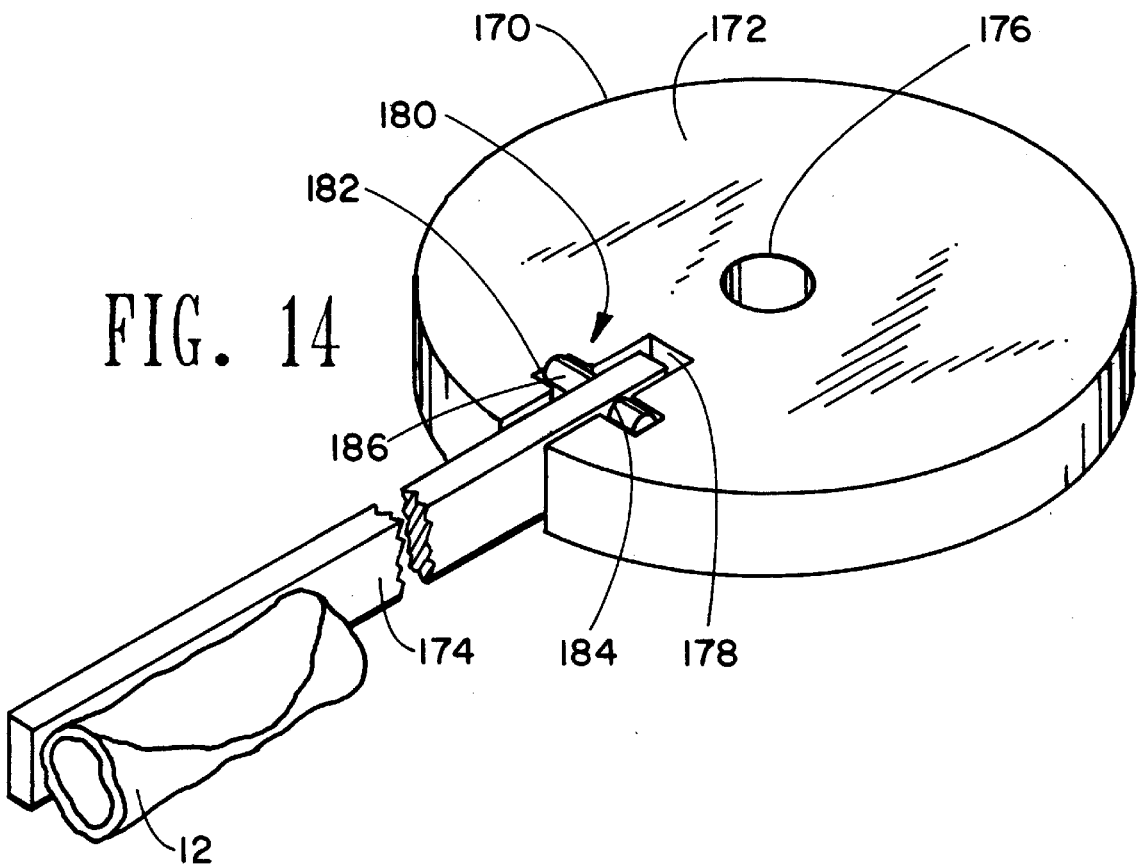
FIG. 14 illustrates a hub and arm which may be used in the invention.
Figure 15:
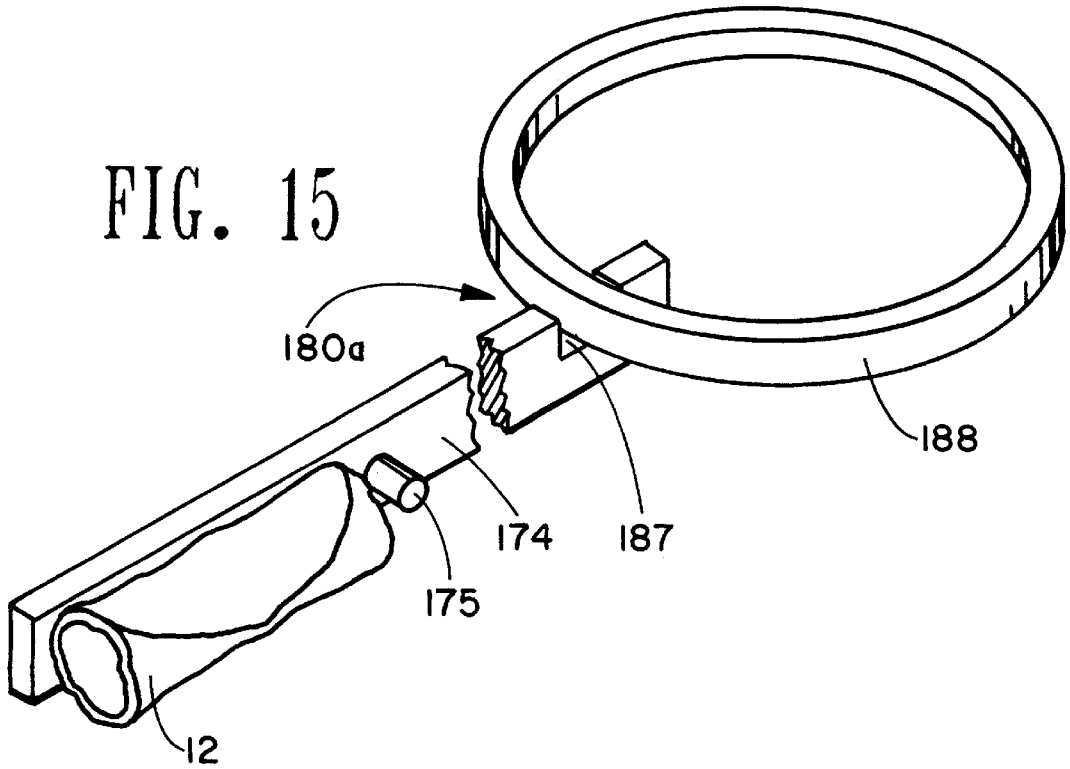
FIG. 15 illustrates a ring and arm which may be used with a hub in the invention.

One embodiment of the carrousel 170 is shown in FIG. 14. In this embodiment, the hub 172 has a central slot 176 for coupling the hub 172 to shaft 162. The hub 172 also includes a plurality of radial slots 178 (only one (1) is shown in FIG. 14 for sake of simplicity). The radial slot 178 is adapted for receiving the arm 174 while allowing the arm 174 to rotate vertically. The end of the arm 174 may be shaped accordingly to allow the arm 174 to rotate a desirable number of degrees as dictated by the incline of the pan 130. A hinge 180 connects the hub 172 to the arms 174. Hinge 180 comprises a groove 182 in the hub 172, a hole 184 through arm 174 and a pin 186 which passes through the hole 184 and is seated in the groove 182. Referring to FIG. 15, portions of another embodiment of the hub 172 are shown. In this embodiment the hinge 180a comprises an annular groove (not shown) in the top of the hub (not shown), a notch 187 in the top of arm 174 and a ring 188 which seats in the annular groove and in the notch 187. The vertical dimension of the arm 174 is preferably only slightly greater than the vertical dimension of the food product 12 and only slightly less than the vertical dimension of the slot 105 in front wall 101. In the case where the food product 12 is an eggroll, the height of the arm 174 should be about one (1) inch. A protuberance 175 may be attached to the side of arm 174 between the ends of the arm 174 to keep or maintain the food product at the periphery of the carrousel 170.

Referring back to FIG. 10, a hood 190 for covering the external portion 134 of the pan 130 is shown. Hood 190 is hinged to the frontwall 101. The hood 190 is preferably flat, semi circular, and includes a lip 192. Two (2) switches (a primary and a back-up, both not shown) in a microwave circuit (not shown) are mounted between the interface of the hood 190 and the frontwall 101 (or sidewall 142).

Figure 11:
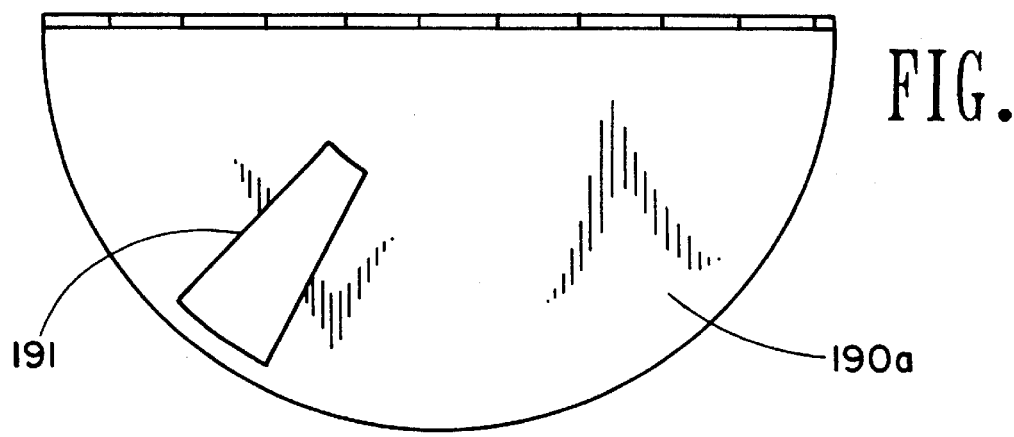
FIG. 11 is a top view of a hood.
Figure 12:
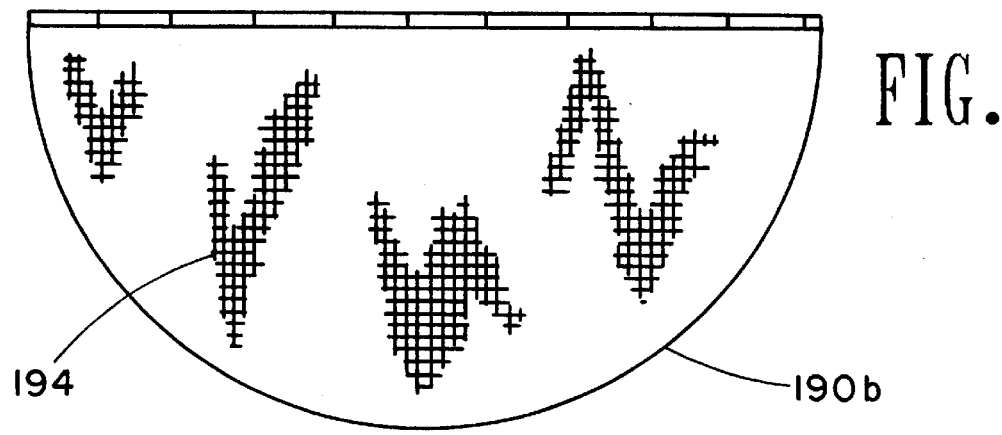
FIG. 12 is a top view of another embodiment of a hood.
Figure 13:
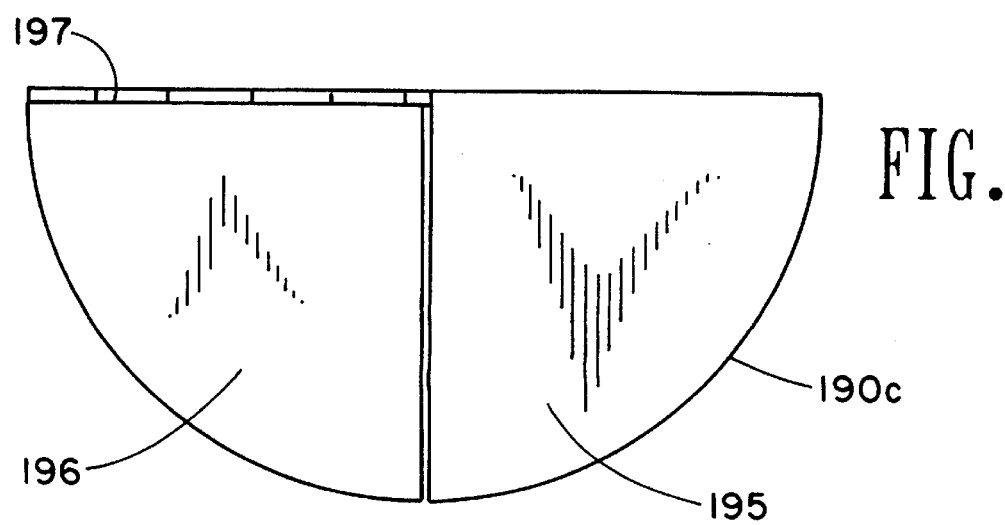
FIG. 13 is a top view of another embodiment of a hood.

Referring to FIGS. 11, 12 and 13, other embodiments of the hood 190 are shown. The hood 190a shown in FIG. 11 includes a cutout 191 which will be located above the periphery of the carrousel 170 when the hood 190a is closed. The dimensions of the cutout 191 should be greater than the dimensions of the food product 12. The food product 12 can be automatically fed into the pan 130 through the cutout 191. A chute (not shown but similar to the chute 150 having double doors) can be mounted on the hood 190a over the cutout 191 for automatically feeding food products 12 while preventing the escape of microwaves. The hood 190b shown in FIG. 12 is made of a screen material 194. The screen material 194 incorporates a fine mesh to prevent microwaves from escaping through the screen 194 while allowing air to pass. The hood 190c shown in FIG. 13 contains a portion 195 which remains closed and a portion 196 which may be opened. Portion 196 is connected by a hinge 197 to the frontwall 101 allowing access only to a quarter circle of the carrousel 170.

In operation, the system and oven 100 have several functions. Some of the peripheral functions include the containment of grease and odor, the containment of microwaves, heating of the oil contained in the vat 110, rotation of the carrousel 170 and automatic dispensing of the food products 12.

The containment of grease and odor is carried out by various features all of which may be individually incorporated or combined: (1) designing the system and oven 100 such that the flow of air (and grease and odors) follows a path in through the frontwall 101 and out through the vent 120; (2) enclosing the vat 110 of oil 112 within the oven 100; (3) inhibiting the oil 112 from being transported out of the pan 130 by the food products 12 or the arms 174; and/or (4) fabricating an integral/unitary grease containment compartment 270 (FIG. 22–23) which may be quickly removed from the oven 100e and replaced.

As previously described, the vent 120 includes a blower (not shown) which draws air through any space between the sidewall 142 and the hood 190 (whether opened or closed) and through the gaps between the perimeters of the doors 156 and 158 and the inner dimensions of the chute 150. Air will then be drawn through the slot 105 and into the main body of the oven 100 where it mixes with air borne grease. The air entrained with grease then exits through the vent 120.

Relating to the third means of containing grease and odors, both the internal portion 132 and the external portion 134 of the pan 130 may be slanted at an angle oblique to the horizontal to keep the oil 112 in the vat 110 and to inhibit transportation of the oil to the external portion 134 of the pan 130 and through the opening 144. The slope in the external portion 134 of the pan 130 will cause the oil which drains from the food products 12 to drain into the vat 110 as the carrousel 170 moves the food products 12 out of the vat 110 and into the external portion 134 of the pan 130.

The containment of microwaves within the system and oven 100 is carried out by limiting the openings or gaps to the oven and by the design of the circuitry for the microwave power source (depicted by reference number 109). Two (2) switches (a primary and a backup switch, both not shown) should be placed on either the frontwall 101 or the sidewall 142. The switches are contained in the circuitry for the microwave power source 109. When hood 190 is closed the switches are closed and the microwave power source 109 will be turned on. When hood 190 is slightly opened, the switches will open causing the microwave power source 109 to be turned off and instantaneous dissipation of the microwaves. Another feature which will assist in containing the microwaves is limiting the clearance, gap or opening between the arms 174 and the front wall 101. A clearance of less than ten (10) centimeters is preferred to inhibit microwaves from passing to the external portion 134 of the pan 130.

Any portion of the microwave field which passes into the external portion 134 of pan 130 will be further contained by the double-door 156, 158 mechanism of the chute 159. More specifically, as food products 12 drop through the opening 144 and pass through the door 156, the door 158 will remain closed. Microwaves will be blocked by the door 158 which contains a gap of approximately one-eighth of an inch between the perimeter of the door 158 and the internal dimensions of the chute 150. As the food product 12 passes through the first door 156, the first door 156 will close. When the food product 12 reaches the second door 158, the first door 156 will be closed to block microwaves as discussed with respect to door 158.

Another function of the oven 100 is to heat and filter the oil 112. The oil 112 will be heated by an oil circulation system as discussed above with respect to FIG. 1, reference numbers 24, 27, 28 and 29.

The means for rotating the carrousel 170 is as follows: The circuitry relating to the motor 160 may be designed such that the motor will remain running when hood 190 is open or such that the motor 160 will shut down when the hood 190 is open. When motor 160 is running it will drive shaft 162 which in turn drives hub 172. Hub 172 drives the arms 174.

Another function of the oven 100 is to automatically dispense the food product 12 as the carrousel 170 moves the food products 12 through the external portion 134 of the pan 130. Each food product 12 will eventually be moved over opening 144 at which time it will drop through opening 144 into chute 150. Chute 150 will transport a food product 12 through the first and second doors 156, 158 such that the food products 12 are automatically dispensed while the oven 100 is operating, thereby eliminating the need to manually open the oven and turn off the microwaves for the removal of food products.

The main function of the system and oven 100 is to prepare the food products 12 by moving the food products 12 simultaneously through the oil 112 and a microwave field. An operator (not shown) will pick up a desirable number of food products 12 to be prepared. The operator will then open the hood 190 at which time the microwave source 109 will be turned off and the carrousel 170 may or may not be rotating. The operator will then place the food products 12, one each between consecutive arms 174. The operator next closes the hood 190. The arms 174 of the carrousel 170 will push or rotate the food products 12 through the external portion 134 of the pan 130 and into the internal portion 132 of the pan 130. The hinge mechanism 180 between each arm 174 and the hub 172 allows each arm 174 to independently and vertically adjust to the bottom of the pan 130 as the arm 174 moves across the slope of the pan 130. For example, as the food products 12 move through the slot 105 the arms 174 and the food products 12 move down into the oil 112 according to the slope of the internal bottom of the pan 130. Simultaneously, the food products 12 will be moving through the microwave field emanating from the microwave source 109. The screen 139 over the internal portion 132 of the pan 130 prevents the food products 12 from floating to the surface of the oil 112. Eventually, each food product 12 and arm 174 will begin to move up according to the slope of the bottom of the pan 130. Once the food product 12 moves out of the pool of oil 112 excess oil will drain from the food product 12. As discussed above, this excess oil will be drained back into the vat 110. The carrousel 170 will continue to move the food products 12 until they drop through opening 144 and into chute 150.

Figure 17:
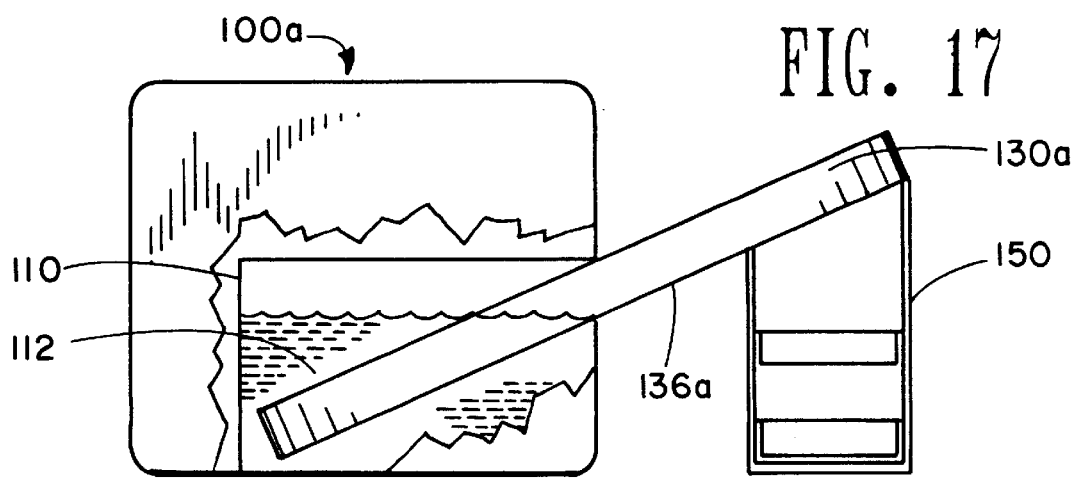
FIG. 17 is an elevational view of another embodiment of the invention with portions of the apparatus being shown in schematic form.

Referring to FIG. 17, another embodiment of a pan 130a is shown. In this embodiment, the bottom 136 of the pan 130a is structured to include a bottom having a constant slope or incline oblique to the horizontal to assist in draining of the oil 112 from the food products 12 into the vat 110.

Figure 18:
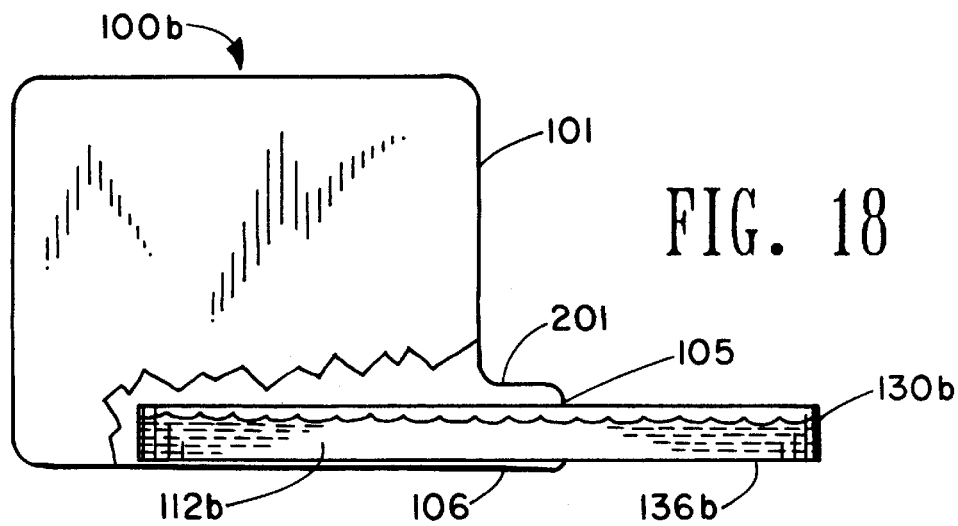
FIG. 18 is an elevational view of another embodiment of the invention with portions of the apparatus being shown in schematic form.

Referring to FIG. 18, another embodiment of an oven 100b and pan 130b are shown. In this embodiment both the pan 130b and the bottom 136b of the pan 100b are horizontal and the pan 130b becomes the container for the oil 112. The carrousel 170 (not shown) will still rotate the food products (not shown) through the oil 112b but the carrousel 170 (not shown) will not have hinges between the arms and the hub 172. The frontwall 101 terminates when it intersects a step or ledge 201 which runs horizontally for a short distance to dissipate microwaves before they exit via slot 105 between ledge 201 and base 106. In this embodiment, pan 130b may not contain an opening 144 for the automatic dispensing of food products 12. In other regards, this embodiment is similar to the embodiment shown and described with respect to FIGS. 10 and 16.

Figure 19:
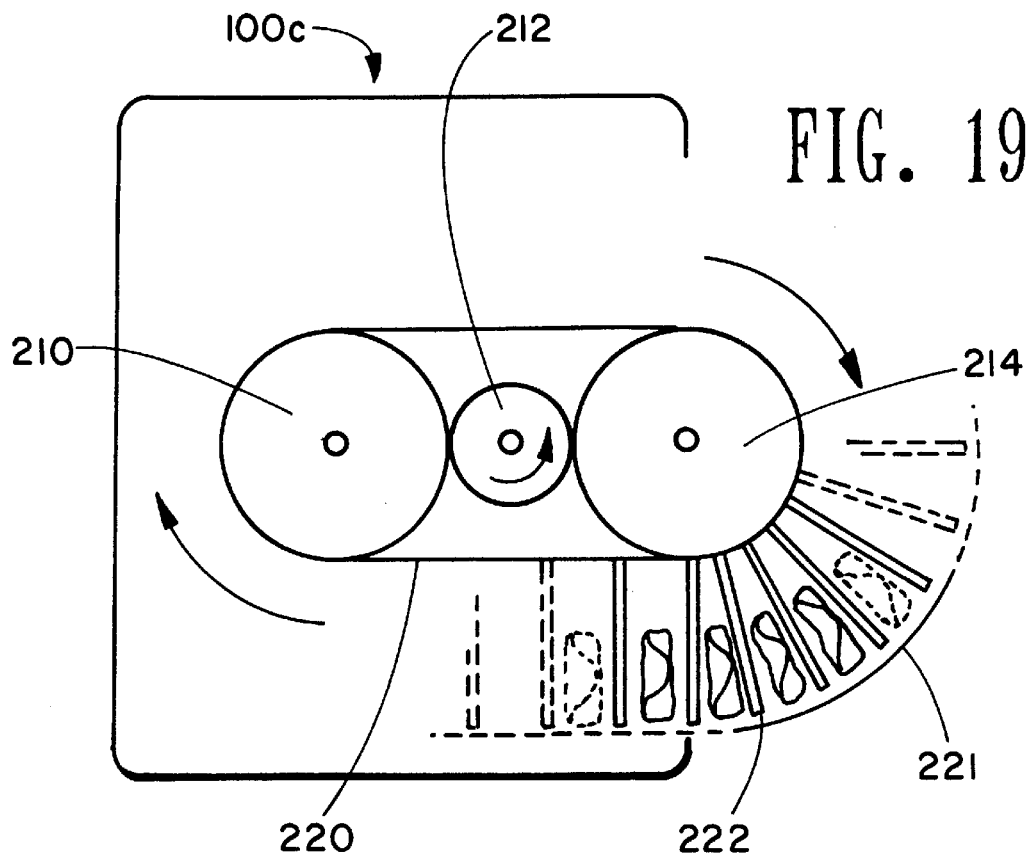
FIG. 19 is a top schematic view of another embodiment of the invention.
Figure 20:
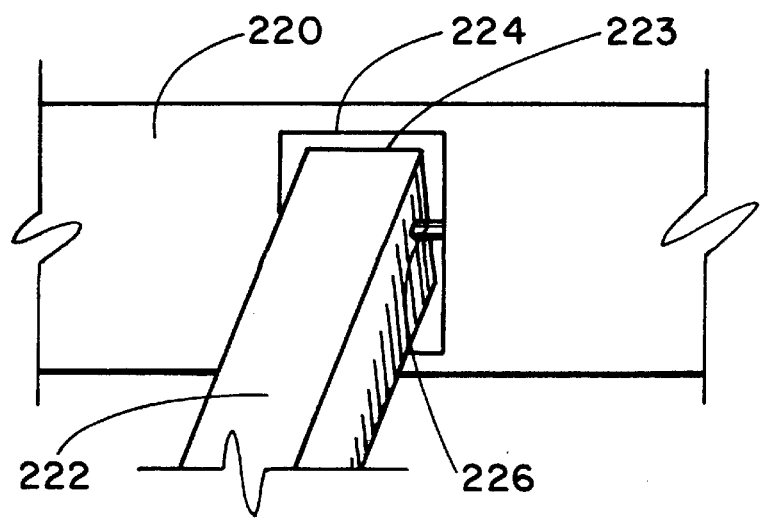
FIG. 20 illustrates an arm and chain which may be used in the embodiment of the invention shown in FIG. 19.

Referring to FIG. 19, another embodiment 100c of a system and oven are shown. In this embodiment the motor (not shown) will drive one of the three gears 210, 212 or 214. The gear which is driven by the motor will in turn drive the other gears. The gears 210 and 214 will drive a belt or chain 220. The chain 220 drives arms 222 around pan 221. Arms 222 will be connected to the chain 220. For example, the chain 220 may contain apertures 224 and prongs 226. The end 223 of the arm 222 may contain a passage for receiving prongs 226. The arm 222 is inserted into aperture 224 with the prongs 226 inserted in the passage in the end 223 of the arm 222. Arm 222 will be driven by the chain 220. The prongs 226 in conjunction with the passage will function as a hinge for the arm 222. The main concept relating to this embodiment is to increase the pathway of the food product 12 within the oven 100c. The bottom of the pan 221 may be horizontal, inclined or a combination of both.

Figure 21:
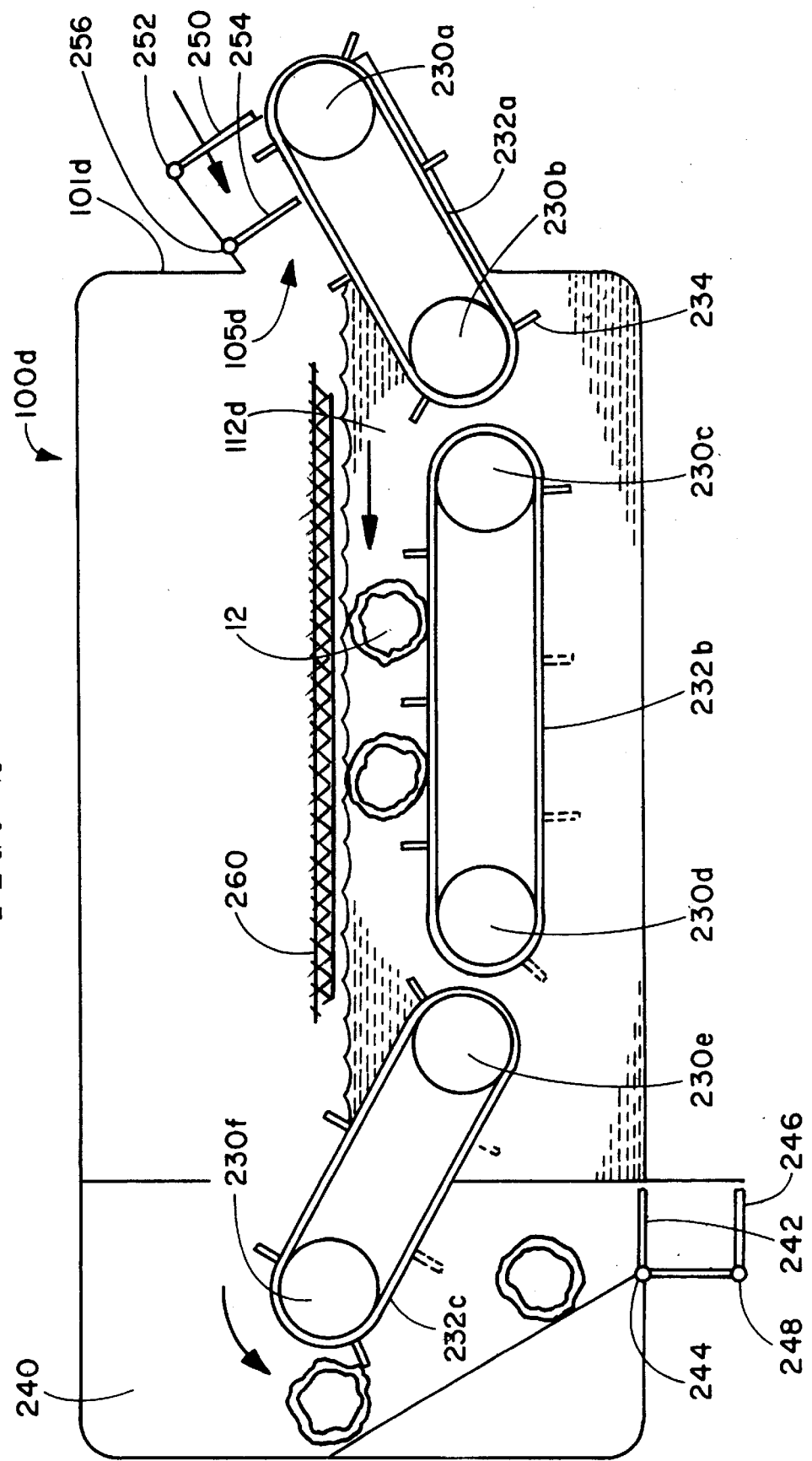
FIG. 21 is an elevational view of another embodiment of the invention with portions of the apparatus being shown in schematic form.

Referring to FIG. 21, another embodiment of the oven 100d is shown. This embodiment contains pulleys 230a–f. The pulleys 230 will drive belts 232a–c. The drive belts 232a–c include flexible teeth 234 for engaging the food product 12. The first belt 232a carries the food products 12 through a first door 250 with a spring hinge 252, through a second door 254 with a spring hinge 256, and through the opening 105d in the front wall 101d of the oven. The first belt 232a also carries the food products down into the pool of hot oil 112d. Once the food product 12 moves into the pool of hot oil 112d, a horizontally disposed cover 260 will prevent the food product 12 from floating to the surface of the pool of hot oil 112d. Once the food product 12 moves to the end of belt 232a it will be transferred to the second belt 232b which moves the food product 12 through the pool of hot oil 112d and through the microwave field. The third belt 232c will carry the food product 12 out of the pool of hot oil 112d, out of the oven 100d and automatically dispense the food products 12 into an outlet chamber 240 which includes a first door 242 with a spring hinge 244 and a second door 246 with a spring hinge 248.

Figure 22:
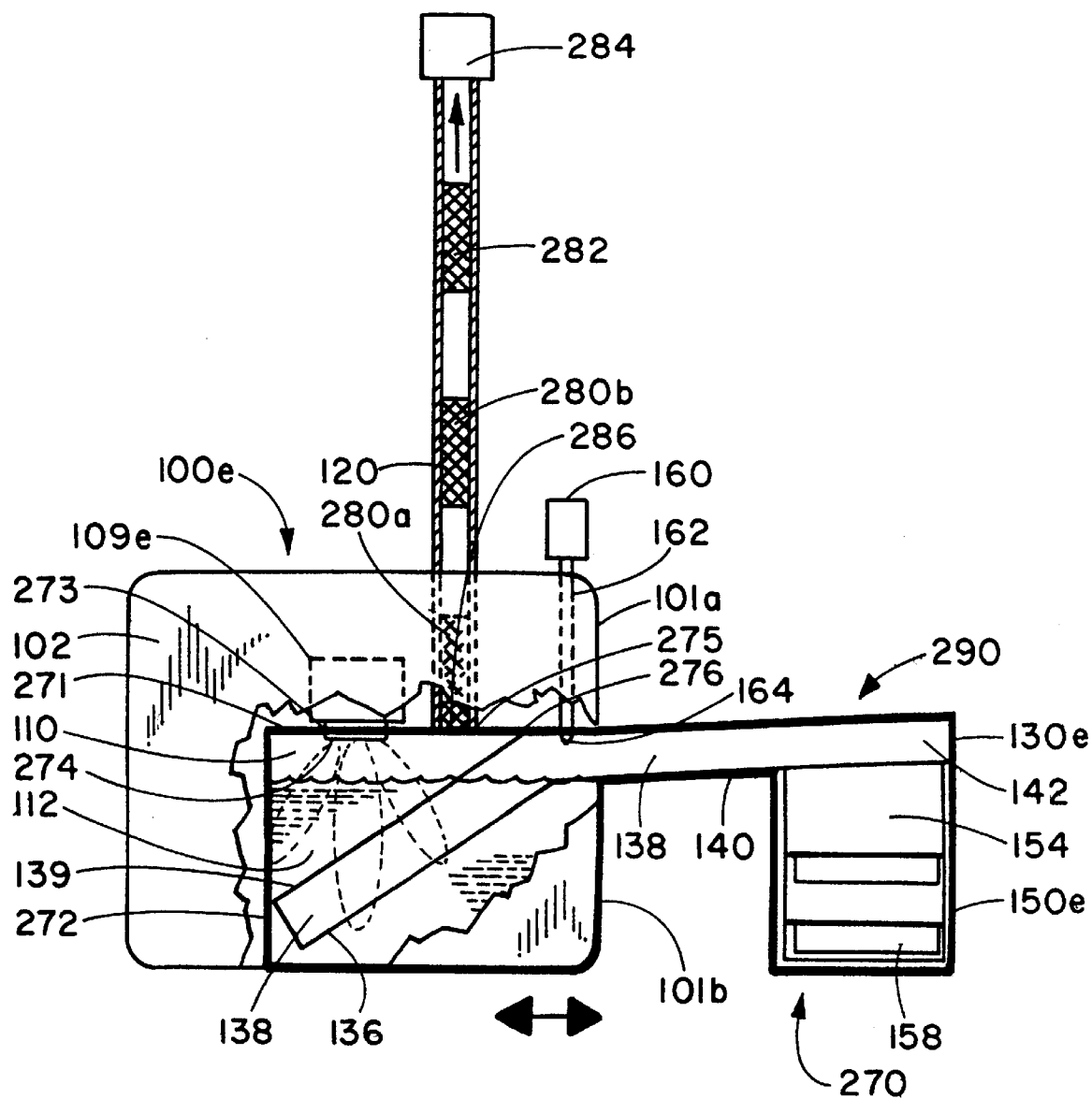
FIG. 22 is an elevational view of another embodiment of the invention with portions of the apparatus being shown in schematic form.
Figure 23:
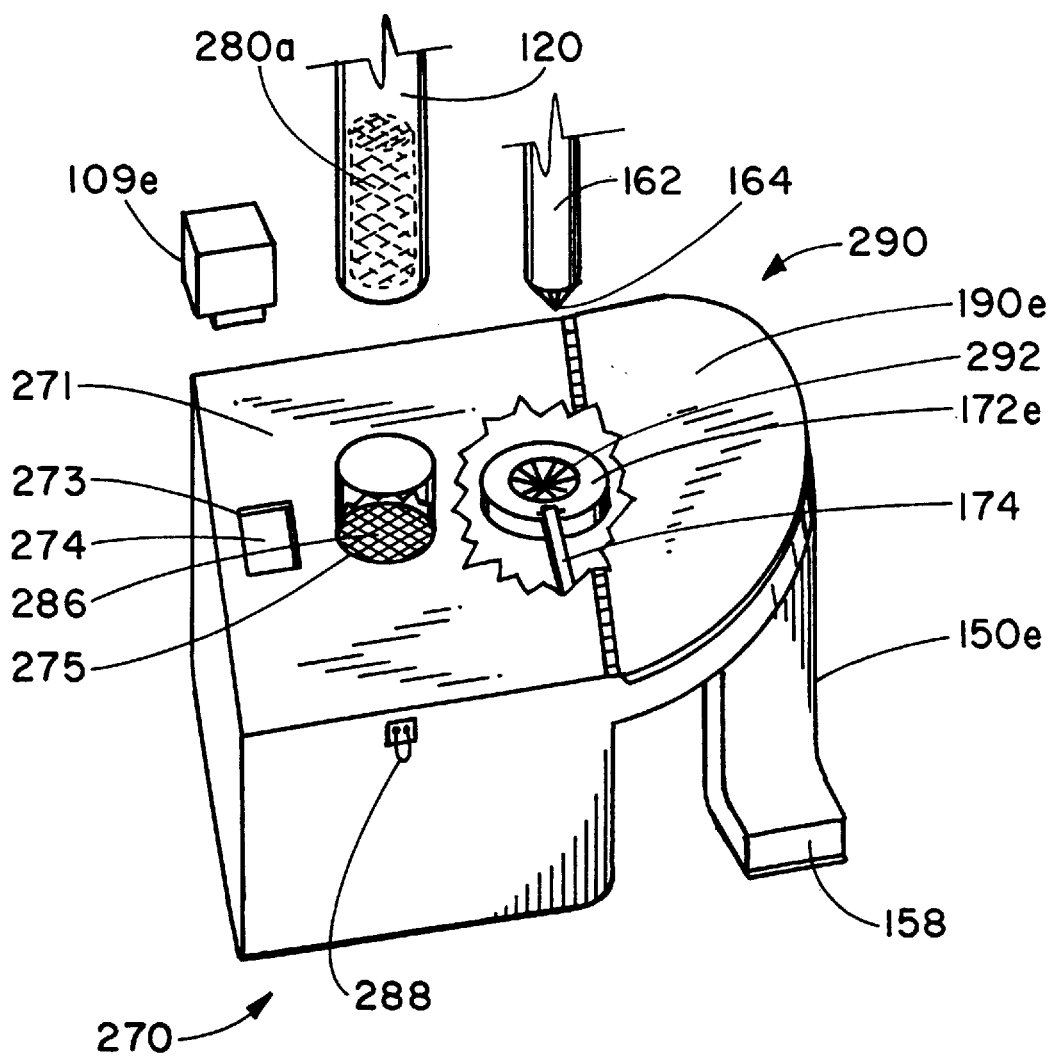
FIG. 23 illustrates the embodiment of the invention shown in FIG. 22 in an exploded view.

Referring to FIGS. 22–23, another embodiment of the oven 100e is shown. In this embodiment the vat 110e, the pan 130e and the chute 150e (if included) are all fixed together to form an integral or unitary grease containment compartment 270. The oven 110e contains a cavity 272 for receiving the grease containment compartment 270. The grease containment compartment 270 may be quickly inserted and quickly removed from the oven 100e via commonly known devices such as latches 288. The oven 100e and grease containment compartment 270 may be constructed so that the compartment 270 slides into the oven 110e either vertically or horizontally. A microwave source 109e is mounted within the oven 100e directly above the cavity 272. The grease containment compartment 270 is enclosed except its topwall 271 will define a microwave entry 273 and a vent opening 275, and the external portion 290 may contain a retractable hood 190e, and/or loading and unloading openings or structures. A filter or a thin sheet of plastic 274 (e.g. one mil. in thickness) either comprises the microwave entry 273 or is placed over an opening in wall 276 of the oven 100e to allow microwaves to pass while preventing grease from contaminating the microwave generator 109e. The wall 276 of oven 100e also defines a vent opening. A vent line 120 is connected over this opening. The vent line preferably contains multiple grease removing filters 280, below a charcoal filter 282, which is below a blower 284. All of the filters 280, 282 and the vent line 120 should be structured such that the filters are replaceable. A screen 286 or a demister pad (not shown) is mounted over the vent opening 275 below the vent line 120. The lower end 164 of shaft 162 includes a conical gear and a quick connect/disconnect coupling (not shown). The hub 172e (with only one arm 174 shown) contains an internal gear 290. The quick coupling may be activated with an upward motion allowing the hub 172e to be quickly engaged or disengaged for insertion or removal of the grease containment compartment 270. A plug or electrical contact surfaces (both not shown) are located in and between the oven 100e and the grease containment compartment 270 for turning the microwave generator 109e and the motor 160 on or off depending on whether a hood or some other similar device in the grease containment compartment 270 is opened or closed. It would be preferable to construct the grease containment compartment 270 such that its dimensions allow it to fit within a briefcase. This allows a service person to bring a clean grease containment compartment to the location of the oven 100e in a briefcase, remove the dirty grease containment compartment, replace the dirty compartment with a clean compartment, place the dirty grease containment compartment in his or her briefcase and to tote the dirty compartment to another location to be cleaned.

Further features and advantages of the invention are as follows:

Referring to FIG. 10, the carrousel 170 will preferably turn at about 1 to 1.2 rotations per minute meaning the food product 12 will be within the oven for approximately thirty to forty-two seconds. This should allow sufficient time to prepare the food product 12 in the hot oil and microwave field.

The carrousel 170 could be designed to include twenty-four (24) arms 174 so that it will have the capacity to contain twenty-four (24) food products 12.

All surfaces which will come into contact with the food product 12 (such as the arms 174 and the pan 130) should be coated with TEFLON or some other suitable material.

Relating to all embodiments of the invention disclosed, all objects which may be within the microwave field should be made of a non-ferrous material to prevent burning of the object.

Relating to the external mode of heating the food product 12, the various embodiments of the invention have been described as including a vat 110 containing a pool of oil 112. However, various other known mechanisms and media used for external heating of a food product may be incorporated. Some examples of other types of heating mechanisms and media include a vat for heating with hot air, with hot steam, etc. for heating by convection and/or conduction.

The vat 110 and/or the carrousel 170 may also be constructed to include structures for rotating and spraying hot oil (not shown but similar to the devices shown in FIGS. 1–7) in order to heat the food product 12 by spraying hot oil over the outer surface of the food product 12.

The various openings or gaps to and from the oven such as the gap between slot 105 and arms 174 may be made small enough or the wavelength of the microwaves may be varied such that the leakage or emission of the microwave radiation is less than the regulatory limit in which case the hood may not be required. The current regulatory limit is the power density of the microwave radiation emitted by a microwave oven shall not exceed one (1) milliwatt per square centimeter at any point 5 centimeters or more from the external surface of the oven, measured prior to acquisition by a purchaser, and thereafter, 5 milliwatts per square centimeter at any point 5 centimeters or more from the external surface of the oven.

What is claimed is:

1. An improved rapid method for preparing a food product by heating, with the food product having an inner filling contained in a wrapper (outer shell/skin) where it is desirable to cook and/or heat the wrapper (outer shell/skin) with hot oil to obtain a crispy wrapper (crust/skin) while in the mean time, to prepare the food product by heating fully and uniformly the inner filling to a desirable temperature and quality comprising the steps of:

placing the food product in a heating chamber having a hot oil and a microwave heating, applying the hot oil to an entire outside surface of the wrapper (outer shell/skin) of the food product;

further preparing the food product in a microwave field; and rotating the food product in the microwave field.

2. The improved rapid method for preparing a food product by heating according to claim 1 wherein said step of heating the food product in a microwave field is performed before said step of applying the hot oil.

3. The improved rapid method for preparing a food product by heating according to claim 1 wherein said step of heating the food product in a microwave field is performed intermittently with said step of applying the hot oil.

4. The improved rapid method for preparing a food product by heating according to claim 1 wherein said step of applying the hot oil comprises spraying the wrapper (outer shell/skin) with the hot oil.

5. An improved rapid method for preparing a food product by heating where it is desirable to heat the food product with an external heating medium to obtain a desirable skin while in the meantime, to heat fully and uniformly a core of the food product to a desirable temperature and quality comprising the steps of:

placing the food product in an oven having microwave heating;

applying the external heating medium to an entire outside surface of the food product;

simultaneous with said step of applying the external heating medium, heating the food product in a microwave field;

moving fresh air into the oven while moving greasy air out of the oven; and removing the food product from the oven while the microwave field continues to be emitted.

6. The improved rapid method for preparing a food product by heating according to claim 5 further including the step of loading the food product while the microwave field continues to be emitted.

7. The improved rapid method for preparing a food product by heating according to claim 5 further comprising the steps of moving a heated food product out of the oven while draining the external heating medium back into the oven.

8. The improved rapid method for preparing a food product by heating according to claim 5 further including the steps of moving a first compartment for containing the food product into a fully powered microwave field and into the external heating medium while simultaneously moving a second compartment for containing the food product into an external portion of a pan and choking the microwave field in the external portion of the pan.

9. The improved rapid method for preparing a food product by heating according to claim 5 further including the steps of containing the external heating medium in a unitary compartment for loading, heating, draining and removing the food product.

10. An apparatus for preparing a food product by heating, comprising:

an oven which defines an opening allowing access to the oven:
 a microwave source/receiver mounted in the oven;
 a means for externally heating the food product mounted in the oven such that a heating medium heated by said means for externally heating the food product will overlap a microwave field emitted by the microwave source/receiver;
 a means for moving the food product through the oven and hence through the heating medium, the microwave field, and out of the oven including an internal portion mounted inside the oven and an external portion mounted outside the oven;
 said external portion of the means for moving the food product having a means for loading the food product and a means for removing the food product; and
 said oven having a gap for preventing the emission of the microwave field.

11. The apparatus for preparing a food product by heating according to claim 10 wherein said means for moving the food product through the oven comprises a carrousel mounted in the oven and coupled to a means for driving the carrousel.

12. The apparatus for preparing a food product by heating according to claim 11 wherein said carrousel includes a hub coupled to the means for driving the carrousel wherein said hub defines a plurality of radial slots for receiving a plurality of arms each of which are connected to said hub at one end by a hinge.

13. The apparatus for preparing a food product by heating according to claims 10 wherein the means for externally heating the food product and said means for moving the food product through the oven are fixed together to form a unitary grease containment compartment wherein said unitary grease containment compartment includes a means for attaching said unitary grease containment compartment to the oven, an entry allowing the passage of the microwave field and a vent opening connected to a vent line mounted through the oven.

14. The apparatus for preparing a food product by heating according to claim 13 wherein the vent line includes a plurality of filters and a blower mounted in the vent line.

15. The apparatus for preparing a food product by heating according to claim 10 wherein said means for externally heating the food product comprises a vat having a pool of oil.

16. The apparatus for preparing a food product by heating according to claim 10 wherein the gap is in a frontwall of the oven.

17. The apparatus for preparing a food product by heating according to claim 10 wherein the gap is defined by said means for removing the food product.

18. The apparatus for preparing a food product by heating according to claim 10 wherein the gap is defined by said means for loading the food product.

19. The apparatus for preparing a food product by heating according to claim 10 wherein said means for moving the food product through the oven includes a means for draining the heating medium from the food product and into the oven.

20. The apparatus for preparing a food product by heating according to claim 10 wherein said external portion of said means for moving the food product through the oven includes a hood hinged to the oven for covering the external portion.

21. An improved rapid method for preparing a food product by heating, with the food product having an inner filling contained in a wrapper (outer shell/skin) where it is desirable to cook and/or heat the wrapper (outer shell/skin) with hot oil to obtain a crispy wrapper (crust/skin) while in the mean time, to prepare the food product by heating fully and uniformly the inner filling to a desirable temperature and quality comprising the steps of:

placing the food product in a heating chamber having a hot oil and a microwave heating:

applying the hot oil to an entire outside surface of the wrapper (outer shell/skin) of the food product by spraying the wrapper (outer shell/skin) with the hot oil; and further preparing the food product in a microwave field.

* * * * *